(12) United States Patent
Lowman et al.

(10) Patent No.: US 9,332,408 B2
(45) Date of Patent: May 3, 2016

(54) SYSTEM AND METHOD FOR PROVISION OF A SECOND LINE SERVICE TO A TELECOMMUNICATIONS DEVICE

(75) Inventors: Philip Lowman, Ellijay, GA (US); George Backhaus, Suwanee, GA (US); Jignesh Gandhi, Dututh, GA (US); Julio Gonzalez, Tucker, GA (US); John Green, Roswell, GA (US); Paul Rubenstein, Johns Creek, GA (US); Michael Speanburg, Lawrenceville, GA (US)

(73) Assignee: Movius Interactive Corporation, Johns Creek, GA (US)

(*) Notice: Subject to any disclaimer, the term of this patent is extended or adjusted under 35 U.S.C. 154(b) by 0 days.

(21) Appl. No.: 13/466,074

(22) Filed: May 7, 2012

(65) Prior Publication Data

US 2013/0295899 A1    Nov. 7, 2013

(51) Int. Cl.
*H04W 4/16* (2009.01)
*H04W 4/14* (2009.01)

(52) U.S. Cl.
CPC . *H04W 4/16* (2013.01); *H04W 4/14* (2013.01)

(58) Field of Classification Search
CPC ......... H04W 4/16; H04W 12/02; H04W 4/14; H04M 3/42255; H04M 3/42008; H04M 3/42229; H04L 65/1046; H04L 65/1069
USPC .......... 455/411, 417, 414.1, 433, 445, 450.1; 379/142.09, 142.02, 142.06
See application file for complete search history.

(56) References Cited

U.S. PATENT DOCUMENTS

| | | | |
|---|---|---|---|
| 6,215,993 B1* | 4/2001 | Ulveland ...................... 455/415 |
| 8,064,582 B2* | 11/2011 | Ma ........................ H04M 15/06 379/142.06 |
| 8,244,215 B1* | 8/2012 | Delaet ................ G06Q 30/0207 455/408 |
| 8,275,110 B2* | 9/2012 | Vendrow ............... H04M 3/436 370/352 |
| 8,548,143 B2* | 10/2013 | Vendrow ................. H04M 3/02 379/201.01 |
| 8,588,387 B2* | 11/2013 | Ma et al. ................... 379/142.09 |
| 9,253,311 B2* | 2/2016 | Bennett .................... H04L 63/30 |
| 2007/0105531 A1* | 5/2007 | Schroeder, Jr. ............... 455/411 |
| 2009/0209236 A1* | 8/2009 | Bloebaum .............. G06N 3/006 455/414.1 |
| 2010/0177662 A1* | 7/2010 | Meincke ............... H04M 15/00 370/254 |
| 2013/0095791 A1* | 4/2013 | Bennett .................... H04L 63/30 455/411 |
| 2013/0115921 A1* | 5/2013 | Szesztay ........... H04M 3/42008 455/411 |
| 2013/0254854 A1* | 9/2013 | Moganti ................. H04L 63/20 726/5 |
| 2013/0295892 A1* | 11/2013 | Backhaus ............... H04W 4/16 455/414.1 |
| 2014/0087692 A1* | 3/2014 | Bennett .................... H04L 63/30 455/411 |
| 2014/0220932 A1* | 8/2014 | Ring ..................... H04L 67/141 455/406 |

* cited by examiner

*Primary Examiner* — Khawar Iqbal
(74) *Attorney, Agent, or Firm* — Smith Tempel; Gregory Scott Smith (57) ABSTRACT

A method for routing calls between a third party telecommunications device ("TD") and a subscriber TD associated with a primary service and a second line service ("SLS") involves associating the SLS number of the subscriber, the primary number of the subscriber and the primary number of a third party via a common relationship number. Calls directed from a third party to the SLS number of a subscriber are routed to an SLS platform and redirected to the subscriber TD. Calls directed from the subscriber TD to the third party use the relationship number to route the call to the SLS platform. The combination of the SLS number and the relationship number identifies the third party calling number for call completion. Calls can be directed to and from an SLS number of a subscriber TD without having to coordinate the provisioning of a call through the subscriber's primary service provider.

13 Claims, 10 Drawing Sheets

305
Second Line Public ID Table

| Subscriber | 2$^{nd}$ Line Number | Primary Number |
|---|---|---|
| 1 | +1.770.555.0001 | +1.408.544.1212 |
| 2 | +1.770.555.0002 | |
| 3 | +1.770.555.0003 | |
| 4 | +1.770.555.0004 | |
| 5 | +1.770.555.0005 | |
| ... | ... | |
| 9,999 | +1.770.555.9999 | |

310
Private Relationship ID Table
(Subscriber 1)

| Subscriber Contact | Relationship Number | 3$^{rd}$ Party Number |
|---|---|---|
| 1 | +1.678.222.0001 | +1.305.229.9999 |
| 2 | +1.678.222.0002 | +1.212.777.8888 |
| 3 | +1.678.222.0003 | +1.408.333.2222 |
| 4 | +1.678.222.0004 | |
| 5 | +1.678.222.0005 | |
| ... | ... | |
| 9,999 | +1.678.222.9999 | |

Central SLS Database 116

FIG. 3A

315
Private Relationship ID Table

| Subscriber Contact | Relationship Number | 3rd Party Number |
|---|---|---|
| 1 | +1.678.222.0001 | +1.305.229.9999 |
| 2 | +1.678.222.0002 | +1.212.777.8888 |
| 3 | +1.678.222.0003 | +1.408.333.2222 |
| 4 | +1.678.222.0004 | |
| 5 | +1.678.222.0005 | |
| ... | ... | |
| 9,999 | +1.678.222.9999 | |

Local SLS Database 106

SYSTEM AND METHOD FOR PROVISION OF A SECOND LINE SERVICE TO A TELECOMMUNICATIONS DEVICE

CROSS-REFERENCE

The Appendix attached hereto is a part of the specification.

BACKGROUND

In simpler times, communication meant a face to face conversation, a hand written note or, perhaps, a phone call between two land lines. Times have changed. People today communicate constantly and simultaneously via myriad channels, most of which are mobile. Of all the means of communication available to today's users, the cellular telephone may be the most ubiquitous. It seems that everybody has one and that everybody uses their mobile device to stay connected, keep their busy lives moving forward, and fulfill their endless responsibilities.

For many people, those endless responsibilities are of a personal and professional mix. Fielding phone calls and texts from family and friends on the same mobile device from which you endeavor to conduct business is a recipe for confusion. When taking a call from your top client, it's probably a good idea to avoid getting it mixed up with a call from your spouse. The greeting "Hey, Honey!" can undermine even the best of business relationships.

To keep the personal and business channels of communication separated, many people simply carry two separate mobile devices, each with its own dedicated phone number and service options. If mobile device "A" rings, the user knows it's of a personal nature. If mobile device "B" rings, the user knows that it's a business related call. Although carrying two mobile devices with you is one solution for keeping personal and business demands separate, keeping track of two mobile devices and their related service plans, however, can be frustrating and expensive.

For many users, porting a second phone number to a single device makes more sense—in doing so, at least the number of devices that must be kept up with in order to keep personal and business matters segregated have been reduced. But current systems and methods for managing multiple numbers on a single device are not without issues. For example, adding a second line to a service plan often dictates that the user have a more expensive "family plan" established with the service provider and often there still is no fool proof way to know which number a calling party has dialed. Using a dual-SIM ("subscriber identity module") phone is another solution, with each SIM card being dedicated to a separate line, but the cost of redundant service plans to accommodate the multiple SIM cards, not to mention the cost of the dual-SIM phone itself, can be exorbitant.

Another solution is to offer a second line number in the form of a virtual number. Calls to the virtual number are intercepted and forwarded to the primary number of a subscriber's mobile device. To distinguish that the incoming call was originally directed to the virtual number as opposed to the primary number associated with the device, virtual number services known in the art simply populate a calling party field with the virtual number. The user sees the virtual number on the caller ID display and knows that the incoming call was made to the virtual number. If the virtual number is being used for a business venture, for example, seeing the virtual number on the caller ID display prompts the user to answer the call with an appropriate greeting. Notably, however, in some virtual number services the user of the virtual number service has no way of identifying the source of the incoming call—he can only know that the incoming call was directed to the virtual number.

In other virtual number services, the problem of identifying the call as an incoming call to the virtual number without sacrificing the ability to also know the source of the incoming call is solved with the addition of a dialable prefix to the incoming call identification (e.g., 88*770.283.5555). Notably, however, to provide such a solution the virtual number service must work in cooperation with the subscriber's primary service provider so that the dialable prefix is acknowledged as a trigger to forward the incoming call to the subscriber's device.

Accordingly, what is needed is a system and method for providing a plurality of dedicated phone numbers to a single telecommunications device in such a manner that the user of the device can separate and manage communications on each. Further, what is needed is a system and method for providing a second line service to a device in such a manner that only a single primary phone number is required from the device's primary service provider. Even further, what is needed is a system and method for providing a second line service to a device in such a manner that the second line service can be provided to the subscriber without having to coordinate the provisioning through the subscriber's primary service provider.

SUMMARY OF THE DISCLOSURE

A method and system are described for routing calls between a third party telecommunications device ("TD") and a subscriber TD associated with a primary service and a second line service ("SLS"). An exemplary method according to one aspect includes receiving a call at an SLS platform that is interposed between a network of a primary service provider to the subscriber TD and a network of a primary service provider to the third party TD. The call, although directed by the third party TD to the subscriber TD associated with the second line service, is routed to the SLS platform.

Upon receiving the call, the SLS platform queries a local database to identify a relationship number that serves to map the subscriber's primary number to the combination of the third party calling number and the subscriber's second line number. The call is then redirected to the primary number of the subscriber's TD and the call is completed. Notably, receipt of the call at the subscriber TD includes transmission of the relationship number and third party calling number combination, thus enabling an application on the subscriber TD to save the combination in a local database.

Advantageously, the relationship number can be used at a later time should the subscriber desire to call the third party. Dialing the third party number from the SLS application on the subscriber TD causes the relationship number for the third party to be dialed. As such, the call is actually routed to the SLS platform which subsequently uses the second line service number of the subscriber TD and the relationship number that routed the call to the SLS platform to determine the actual third party called number. Using the actual third party called number, the SLS platform completes the second leg of the call.

By associating the SLS number of the subscriber, the primary number of the subscriber and the primary number of a third party via a common relationship number, calls can be directed to and from a second service line of a subscriber TD without having to provide the second line service through the subscriber's primary service provider.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the terms "application" and "app" may also include files having executable content, such as: object code, scripts, byte code, markup language files, and patches. In addition, an "application" referred to herein, may also include files that are not executable in nature, such as documents that may need to be opened or other data files that need to be accessed. Further, an "application" may be a complete program, a module, a routine, a library function, a driver, etc.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "telecommunications device," "communication device," "wireless device," "wireless telephone," "wireless communication device" and "wireless handset" are used interchangeably. With the advent of third generation ("3G") and fourth generation ("4G") wireless technology, greater bandwidth availability has enabled more portable computing devices with a greater variety of wireless capabilities. Therefore, a telecommunications device ("TD") may include a cellular telephone, a pager, a PDA, a smartphone, a navigation device, a tablet personal computer ("PC"), or a hand-held computer with a wireless connection or link.

In this description, the terms "call" and "communication," in their noun forms, envision any data transmission routed across a network from one device to another including, but not limited to, a voice transmission, a text message, a video message, a page, a data transmission, etc.

Figure 1:
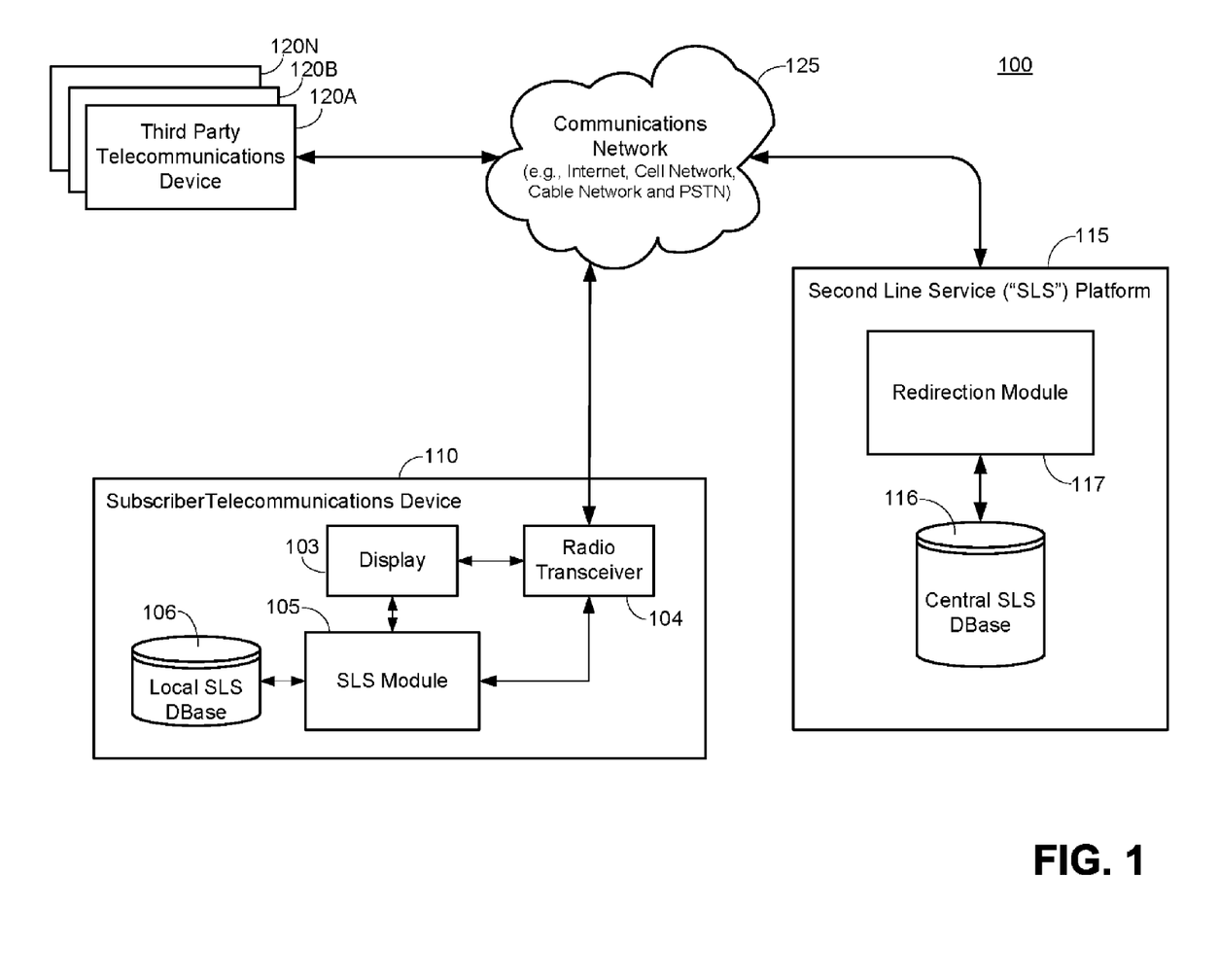
FIG. 1 is a high level diagram illustrating exemplary components of a system for providing a second line service ("SLS") to a user of telecommunications device ("TD").

Referring to FIG. 1, depicted is a high level diagram illustrating exemplary components of a system 100 for providing a second line service to a user of TD 110. TD 110 is also associated with a primary phone number assigned to it by a primary service provider, as is understood by one of ordinary skill in the art. A subscriber to a second line service ("SLS") offered through exemplary system 100 may receive calls at TD 110 that are directed to either of the primary phone number provided by the primary service provider or the secondary phone number ("SLS phone number") provided by the SLS platform 115.

In general, any call directed to either of the primary phone number or the SLS phone number are transmitted from a third party TD 120 to the subscriber TD 110 by way communications network 125. Notably, communications network 125 envisions any and all networks for transmitting and terminating communications between telecommunications devices such as, but not limited to, cellular networks, PSTNs, cable networks and the Internet. Methods for effecting the transmission of data across communications network 125 from one device to another, including call setups, terminations and the like are understood by those of ordinary skill in the art of data transmission.

A call made from a third party TD 120 to the primary number associated with subscriber TD 110 is transmitted across communications network 125 and routed to subscriber TD 110, as is understood in the art. The radio transceiver 104, if the TD 110 is a portable and wireless device, enables the receipt and transmission of signals to and from subscriber TD 110. The call signal may include the calling line identification ("CUD"), i.e. the phone number, associated with third party TD 120 such that when the call is received at subscriber TD 110, the CLID may be displayed for the benefit of the subscriber on display component 103. Notably, although the exemplary embodiments described in the present disclosure use the CUD as an example of data that may displayed for the benefit of the user of a subscriber TD 110, it will be understood that any data associated with the third party TD 120, subscriber TD 110, SLS platform 115 or the like may be rendered for the benefit of the user of the system 100 and, as such, only describing that the CUD is displayed will not limit the scope of what is envisioned by the disclosure. Moreover, it is envisioned that any data uniquely associated with a call to a primary number or an SLS number may be displayed for the benefit of a subscriber to the system 100.

Returning to the FIG. 1 illustration, a call made from a third party TD 120 to an SLS number associated with subscriber TD 110 is transmitted across network 125. The network 125 recognizes where the call needs to be routed based on the called number (the SLS number associated with the subscriber) and routes the call to SLS platform 115. SLS platform 115 thus effectively intercepts the call, determines that the call was intended for subscriber TD 110 and then forwards the call to subscriber TD 110. In this way, while a call directed to a primary number associated with subscriber TD 110 is routed directly to subscriber TD 110, a call directed to a second line number associated with subscriber TD 110 is routed to SLS platform 115 instead. Once received at SLS platform 115, a query of central SLS database 116 by redirection module 117 may determine that the call from third party TD 120 was meant for the second line number associated with subscriber associated with TD 110. Once the determination is made, redirection module 117 may modify the call data to include data that reflects its identification as a call for the second line number and then forward the call to the primary number associated with subscriber TD 110.

Because the call includes data identifying it as a call to the second line number associated with subscriber TD 110, SLS module 105 may intercept the incoming call, or otherwise be injected into the call processing activity for the call, and then leverage data stored in local SLS database 106 to render it in such a way that the user or subscriber associated with TD 110 knows that the call is for the second line number as opposed to the primary number. The SLS module 105 is designed to work with radio transceiver 104 and any stored or retrievable content in local SLS database 106 to terminate a call to a second line number, render associated data and provide services uniquely associated with the second line number such as, but not limited to, dedicated voicemail, ringtones, caller ID, automated responses, etc.

A more detailed description of the exemplary method, including exemplary methods for receiving a call from a third party TD 120 and making a call to a third party TD 120 by way of the SLS platform 115 will be described below relative to FIGS. 4-6.

Figure 2:
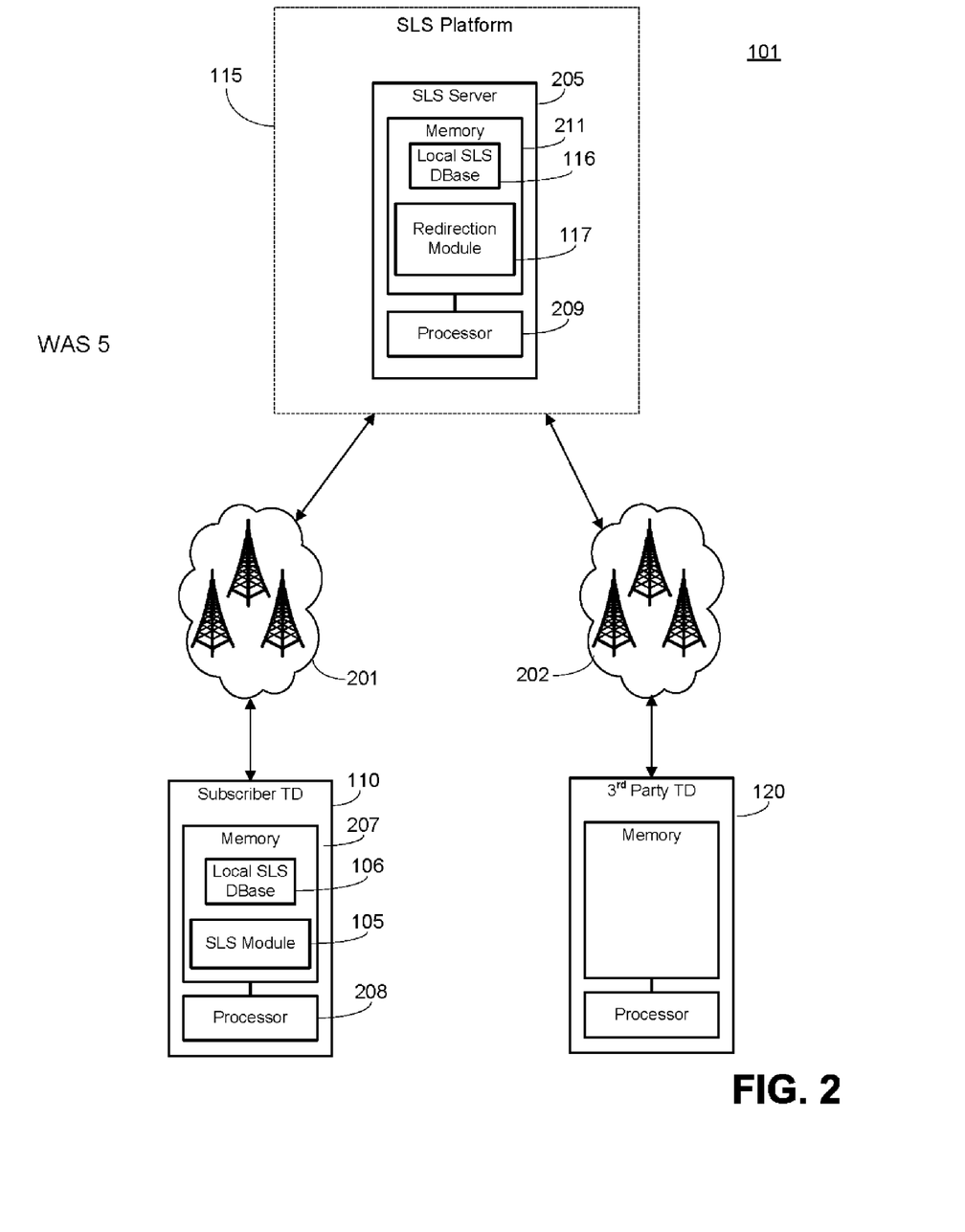
FIG. 2 is a diagram of an exemplary computer architecture for the system of FIG. 1.

Referring to FIG. 2, a diagram of exemplary computer architecture 101 for the system 100 of FIG. 1 is depicted. The exemplary architecture 101 may include a subscriber telecommunications device ("TD") 110 and a third party TD 120. An SLS platform 115 may be connected to the subscriber TD 110 via a first provider network 201 and to the third party TD 120 via a second provider network 202, although it is envisioned that TDs 110 and 120 may be associated with a common service provider. The SLS platform 115 may include an SLS server 205 configured to receive calls directed to and from a second line number associated with subscriber TD 110.

As illustrated in FIG. 2, the SLS server 205 includes a processor 209 and a memory 211 coupled to the processor 209. The memory 211 may include instructions for executing one or more of the method steps described herein. Further, the processor 209 and the memory 211 may serve as a means for executing one or more of the method steps described herein. As indicated, the memory 211 may also include a redirection module 117 and a central SLS database 116. Notably, it should be understood that the term server 205 may refer to a single server system or multiple systems or multiple servers. One of ordinary skill in the art will appreciate that the various server arrangements may be selected depending upon computer architecture design constraints and without departing from the scope of the invention.

As further illustrated in FIG. 2, the subscriber TD 110 may include a processor 208 and a memory 207 coupled to the processor 208. The memory 207 may include instructions for executing one or more of the method steps described herein. Further, the processor 208 and the memory 207 may serve as a means for executing one or more of the method steps described herein. As indicated, the memory 207 may also include an SLS module 105 and a local SLS database 106.

Figure 3A:
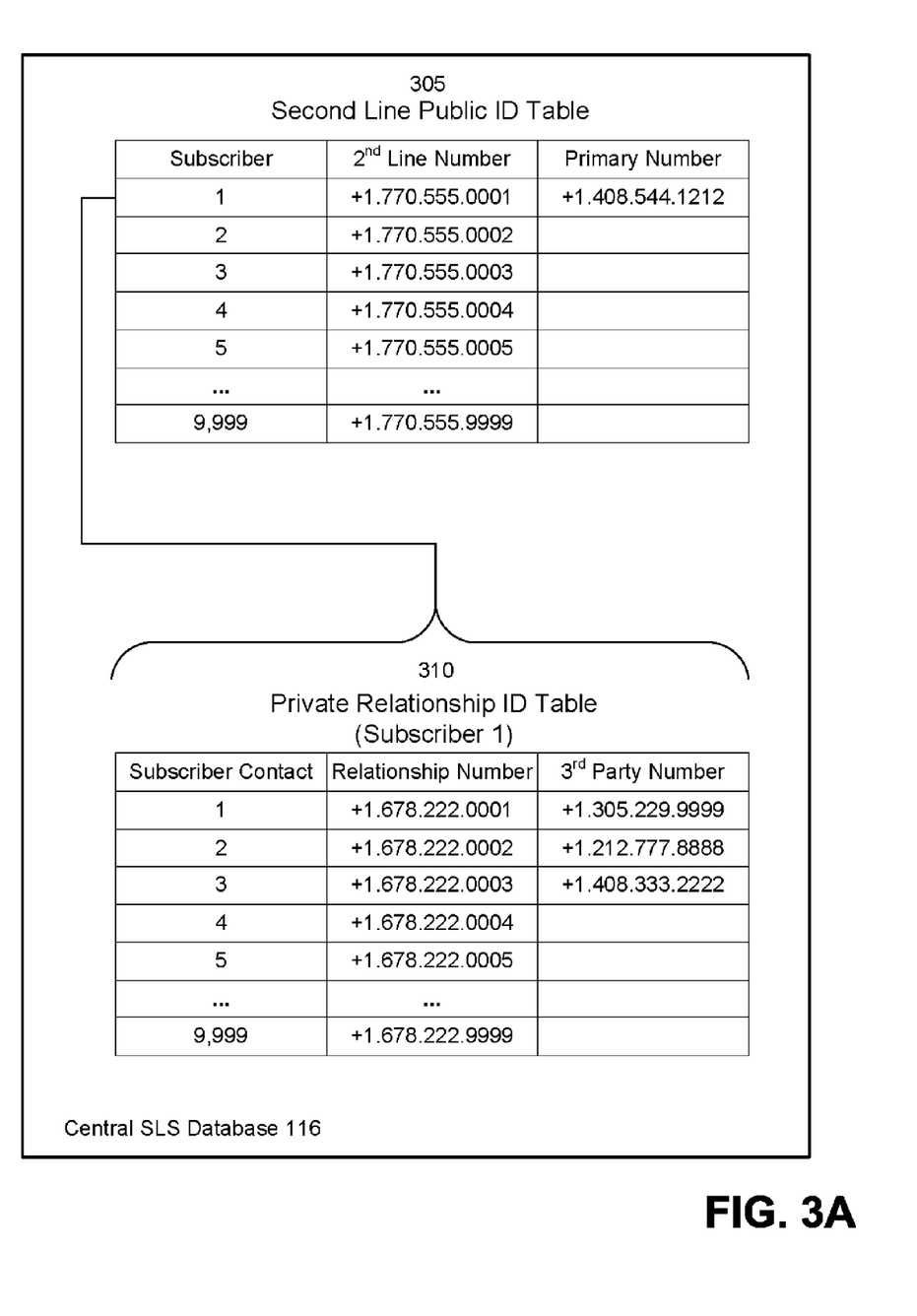
FIGS. 3A-3B illustrate exemplary data tables that may be leveraged by a redirection module of an SLS platform and an SLS module of a subscriber TD to provide a second line service to a user of the subscriber TD.
Figure 3B:
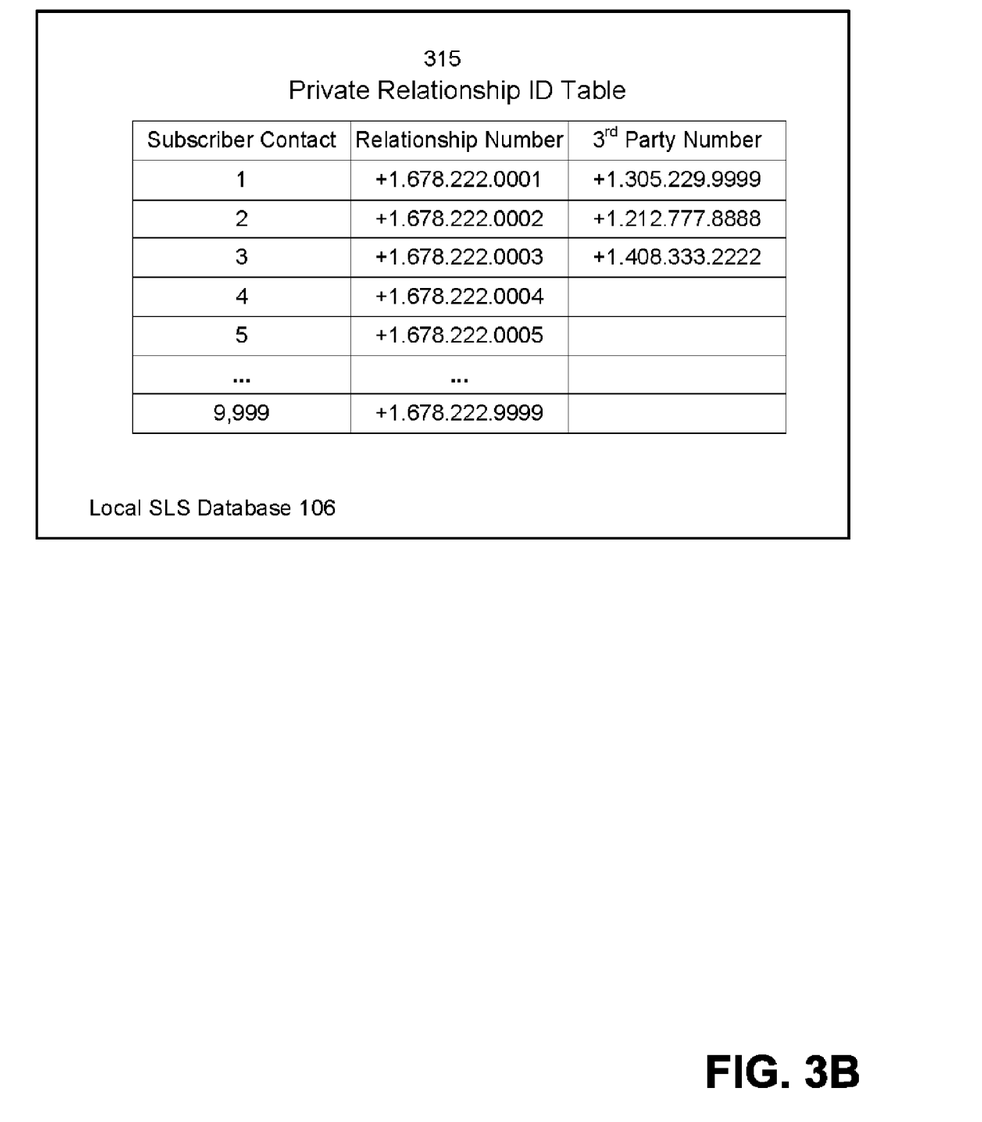

Referring to FIGS. 3A-3B, illustrated are exemplary data tables that may be leveraged by a redirection module 117 of an SLS platform 115 and an SLS module 105 of a subscriber TD 110 to provide a second line service to a user of a subscriber TD 110. The Second Line Public ID Table 305 and Private Relationship ID Table 310 of FIG. 3A may be stored in a central SLS database 116 while the exemplary Private Relationship ID Table 315 of FIG. 3B may be stored in a local SLS database 106. An illustrative embodiment of a method for providing a second line service will now be described in the context of the exemplary data tables reflected in FIGS. 3A-3B.

Embodiments of the method for providing a second line service leverage intermediate phone numbers to ensure that calls meant for the user of subscriber TD 110 route to the SLS platform 115. Once the call reaches the SLS platform 115, an application running on redirection module 117 makes a translation to complete the call. The SLS platform 115 maintains a master list of SLS phone numbers that are in service. In some embodiments, these numbers may be owned by the SLS service provider. In the telephone network 125, these numbers route to the SLS platform 115 (i.e., the SLS platform may exist in network 125 as a telephony peripheral).

The SLS service provider that manages the SLS platform 115 essentially has a group of SLS numbers that are his inventory and are provided to subscribers of the SLS service. Referring to the Second Line Public ID Table 305, the example subscriber #1 has been issued SLS number 1.770.555.0001. As such, subscriber #1 may choose to use his SLS number as a business number and give it out to contacts. Notably, in Second Line Public ID Table 305 the primary number, 1.408.544.1212, that is assigned to the subscriber TD 110 by the primary service provider 201 is associated with subscriber #1 and his SLS number 1.770.555.0001.

For each subscriber to the SLS service, a Private Relationship ID Table 310 is also maintained. Referring to the Private Relationship ID Table 310, it can be seen that the SLS service provider has another list of dialable phone numbers, i.e. relationship numbers, which are maintained. These relationship numbers are essentially "hidden numbers" that are used to facilitate calls between the subscriber's TD 110 (which, again, is actually a TD with a number and service provided by a primary service provider, such as primary service provider 201) and the SLS platform 115 operated by the SLS service provider.

Concerning the Private Relationship ID Table 310, one of ordinary skill in the art will understand that certain embodiments may not formally distinguish one subscriber's records from that of another via individual private relationship ID tables. Rather, as is understood in the art of database management and query, a more general relational database including records associated with multiple subscribers may be used to map subscriber number and third party number combinations to given relationship numbers. As such, it will be understood that the description in this disclosure of exemplary embodiments that include individual private relationship ID tables are offered for illustrative purposes only and will not limit the scope of the disclosure.

Additionally, concerning the use of relationship numbers, it is envisioned that certain relationship numbers may be used for a plurality of subscriber number and third party number combinations, i.e. in certain embodiments a given relationship number may not be unique to a given subscriber number and third party number combination. For example, in an illustrative embodiment, subscribers D, E, F and G, may all have database records that map relationship number X to third party numbers J, K, L and D, respectively. Notably, in this exemplary scenario, the last subscriber number and third party number combination (G:D) is meant to envision a case where G has a calling relationship with D. In such case, although D is a subscriber to the SLS service he may also be treated as a third party caller relative to subscriber G. To carry the example further, if G has a relationship with D, D also has one with G. However, the D:G combination may or may not use a different relationship number Y.

Returning to the FIG. 3 illustrations, as mentioned above, the relationship numbers are "behind the scenes" numbers that are hidden from the subscriber. This is accomplished by an app running on SLS module 105 residing on subscriber TD 110. As will be explained in more detail, the SLS module 105 leverages the app to translate any number calling the subscriber, or called by the subscriber, into the appropriate Relationship Number. The application run by the SLS module 105 on subscriber TD 110 uses a relationship number to access the SLS platform 115 over the telephone network 125. The SLS number is used by the redirection module 117 of the SLS platform 115 to complete calls with any external party calling the subscriber's SLS number or being called by the SLS subscriber using SLS module 105 of subscriber TD 110. Essentially, by leveraging the relationship numbers, an SLS service provider may insert itself into the middle of a call between a third party TD 120 and a subscriber TD 110 which have primary services provided by different service providers 202 and 201, respectively.

For example, referring back to the tables in FIG. 3 and the system architectures described in FIGS. 1-2, Subscriber #1 associated with subscriber TD 110 already has mobile phone service via primary service provider 201 using mobile phone number 1.408.544.1212. Subscriber #1 subsequently subscribes to an SLS service provided by way of SLS platform 115 and is assigned SLS number (i.e., a second line number) 1.770.555.0001. The relationship between the subscriber's primary number and the SLS number is reflected in Second Line Public ID Table 305 of FIG. 3A. 1.770.555.0001, for example, may be the phone number that subscriber #1 publishes for his side business, personal calls, etc.

A third party, identified in Private Relationship ID Table 310 of FIG. 3A as being Subscriber Contact #1, is associated with a third party TD 120A having a primary phone number 1.305.229.9999. The service associated with the third party's TD 120 and primary phone number 1.305.229.9999 may be provided by service provider 202. Notably, as one of ordinary skill in the art understands, as with any phone service, a called party can receive calls over the telephone network 125 from a telecommunications device on any service provider's network.

Returning to the example, the third party uses TD 120A to place a call to the subscriber #1 SLS number 1.770.555.0001. As described above, the call is routed to the SLS platform 115. The SLS platform 115 accepts the call (without connecting the voice path to the third party TD 120A) and determines that the call is for SLS number 1.770.555.0001 and that 1.770.555.0001 does not yet have a "relationship" set up for the calling number, 1.305.229.9999 (for purposes of this example, subscriber #1 has only recently subscribed to the SLS service and Private Relationship ID Table 310 does not yet contain any records—i.e., the third party associated with TD 120A is the first to place a call to the SLS number of subscriber #1).

The SLS platform 115 creates the following relationship in Private Relationship ID Table 310: When 1.770.555.0001 receives (or places) a call from/to 1.305.229.9999, the interaction with the subscriber's phone (1.408.544.1212) will use dialable telephone number 1.678.222.0001. Notably, it is envisioned that a given relationship number, such as relationship number 1.678.222.0001 in the present example, may be used as a relationship number for many different SLS subscribers as it is the combination of the subscriber's primary number and/or the SLS number and the relationship number that map to the external number (in this case, 1.305.229.2999).

Returning to the example, now that the relationship number 1.678.222.0001 has been established in connection with subscriber #1 and the calling third party, the SLS platform 115 may proceed to establish the second half of the call—the call from the SLS platform 115 to the subscriber's TD 110. The SLS platform 115 places the call to the primary number 1.408.544.1212 that points to subscriber TD 110 per its primary service provider 201.

The calling party field of the call placed from SLS platform 115 to subscriber TD 110 may contain a specially encoded message for the SLS phone app running on SLS module 105. In some embodiments, the calling party field may contain the relationship number established by the SLS platform 115 (in this example, 1.678.222.0001) and the actual primary number of the calling third party (in this example, 1.305.229.9999), separated by a dialable separator such as a "star" character. Notably, it is envisioned that other embodiments may populate the calling party field, or provide other metadata, that serves to trigger recognition of the incoming call as a call directed to the SLS number of the subscriber. As such, by describing the exemplary embodiment to populate the calling party field with a combination of the relationship number and the third party's actual phone number, the scope of the disclosure will not be limited.

Returning to the example, having recognized that the incoming call is from the SLS platform 115, the SLS module 105 stores the combination of the relationship number 1.678.222.0001 and third party actual number 1.305.229.9999 in the local SLS database 106. To complete the exemplary call, the SLS module 105 may cause the actual phone number associated with the third party TD 120A, 1.305.229.9999, to be rendered on display component 103 as an identification of the calling party and rings the phone. Once the subscriber #1 answers, the SLS platform 115 connects the two legs of the call (leg 1 represented by third party TD 120A to SLS platform 115 and leg 2 represented by SLS platform 115 to subscriber TD 110) by methods known and understood by those of ordinary skill in the art of telecommunications. As non-limiting examples, the calls can be connected via a forward or a bridge, as well as other technologies.

Notably, in the example, the combination of the relationship number 1.678.222.0001 and the third party actual calling number 1.305.229.9999 is now stored in the central SLS database 116 at SLS platform 115 and also in the local SLS database 106 in subscriber TD 110. As one of ordinary skill in the art will recognize, the importance of the relationship number is that it may also provide a mechanism by which the SLS platform may intercept calls originating from subscriber TD 110 via SLS number.

Furthering the example, Subscriber #1 desires to originate a call to the third party associated with 1.305.229.9999 from his SLS number 1.770.555.0001. Because the third party associated with 1.305.229.9999 had previously placed a call to the SLS number 1.770.555.0001, the relationship combination that maps Subscriber #1's SLS number 1.770.555.0001 and the third party phone number 1.305.229.9999 to relationship number 1.678.222.0001 is already stored in both the central SLS database 116 at SLS Platform 115 and the local SLS database 106 in subscriber TD 110.

To place calls from his SLS number, Subscriber #1 uses the SLS phone app of SLS module 105 as his dialer. In the SLS dialer (not depicted in the Figures), Subscriber #1 dials the third party number 1.305.229.9999 which is reflected in the Private Relationship ID Tables 310, 315 as being associated with his Contact #1. The SLS module 105 queries Private Relationship ID Table 315 in local SLS database 106 and translates the called third party number 1.305.229.9999 to relationship number 1.678.222.0001. The SLS module 105 may indicate to the subscriber via display 103 that it is calling 1.305.229.9999, but instead it calls the relationship number 1.678.222.0001. By calling the relationship number associated with Contact #1, the network 125 routes the call to the SLS platform 115 instead of directly to third party TD 120A phone. The SLS module 105 may also modify the "calling number" field in the signaling, that is instead of populating the field with the actual number of the calling device (1.408.544.1212), it may populate it with the SLS number (1.770.555.0001). In this way, it will appear to Contact #1 that he is receiving a call originating from the SLS number of the subscriber instead of the primary number (1.408.544.1212) associated with subscriber TD 110.

When the SLS platform 115 processes this first leg of the call, it may recognize that the calling number is the subscriber's SLS number 1.770.555.0001 and the called number is the relationship number 1.678.222.0001. Querying the Private Relationship ID Table 310 in central SLS database 116, the redirection module 117 may apply the following logic: "when SLS number 1.770.555.0001 calls relationship number 1.678.222.0001, it is actually calling 1.305.229.9999." The SLS platform 115 may then follow that logic and complete the subscriber's call by calling the actual number 1.305.229.9999 associated with third party TD 120A. Notably, in completing the second leg of the call from Subscriber #1 to the third party associated with third party TD 120A, the SLS platform 115 may cause the calling number to be reflected as the SLS number 1.770.555.0001 instead of the actual primary number of subscriber TD 110.

As described above, it is envisioned that another SLS subscriber (for example, Subscriber #2 having SLS number 1.770.555.0002) could also call using the same relationship number (1.678.222.0001), but it would map to a different external number associated with a contact of Subscriber #2. The encoded representation of the actual called number is a combination of the SLS number and the relationship number.

FIGS. 4A-4D collectively illustrate an exemplary method 400 for routing calls between a third party telecommunications device, such as third party TD 120, and a telecommunications device associated with a subscriber to a second line service, such as subscriber device 110. At block 402, a call is routed to and received by an SLS platform 115. Next, at decision block 404, the SLS platform 115 determines whether the call originated from a third party seeking to connect to a subscriber's device, i.e. whether a third party has dialed an SLS number associated with an active subscriber to the SLS service provided by SLS platform 115. If the call did not originate from a third party, then the "no" branch is followed to block 432 of FIG. 4C. If the call did, in fact, originate from a third party, then the "yes" branch is followed to block 406. Notably, if a call is directed to the SLS platform 115, one of ordinary skill in the art will recognize that the actual number used for routing the call to the SLS platform 115 was either an SLS number of a subscriber (if dialed by a third party) or a relationship number (if leveraged by an SLS module 105 of a subscriber TD 110), consistent with that which has been described above.

Figure 4A:
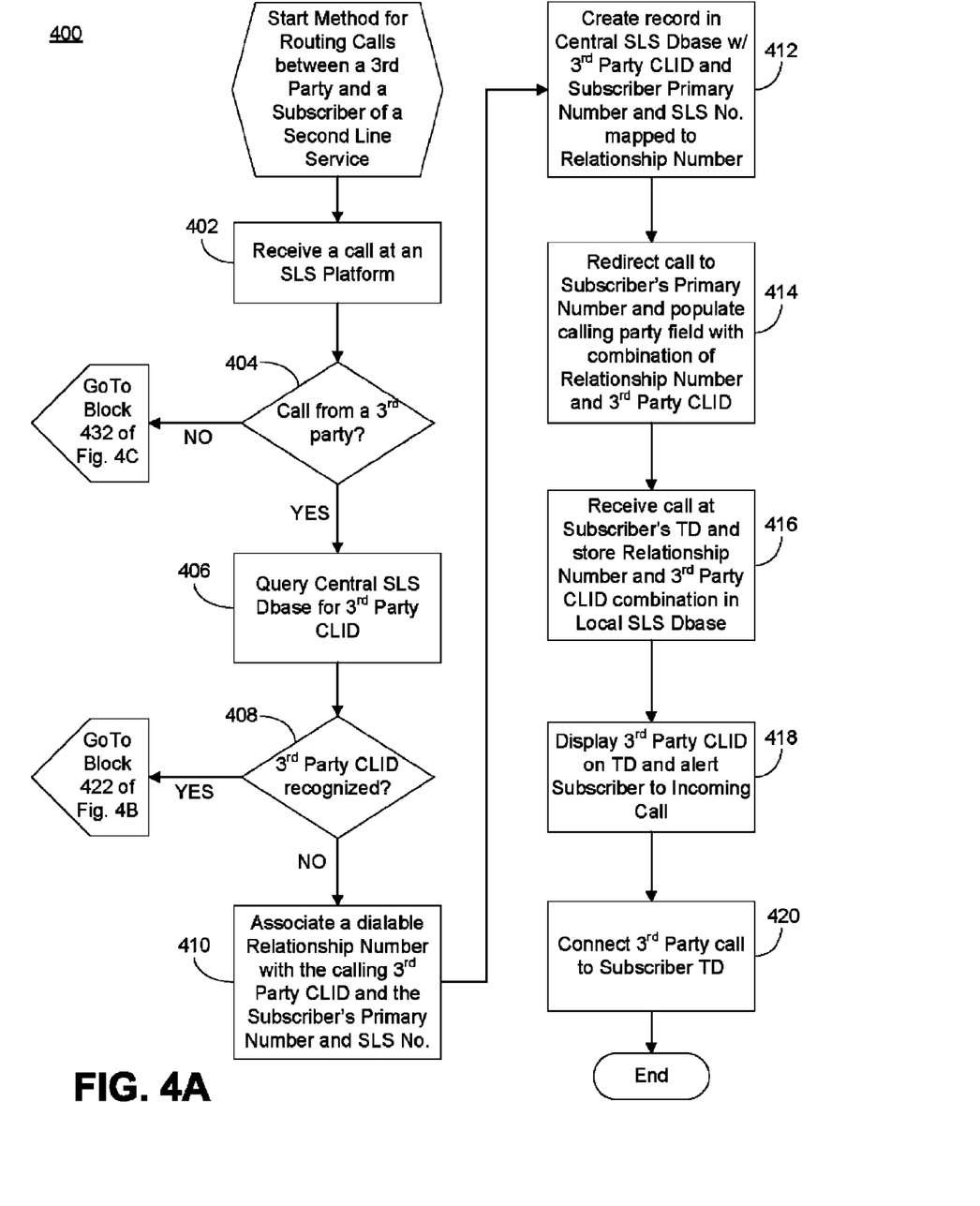
FIGS. 4A-4D collectively illustrate an exemplary method for routing calls between a third party TD and a subscriber TD.

At block 406, the SLS platform 115 queries central SLS database 116 for the calling line ID ("CUD"), i.e. the phone number of the calling party, in association with the relationship number that caused the call to be routed to the SLS platform 115. If at decision block 408, the SLS platform 115 successfully queries the calling party CUD and relationship number combination, then the "yes" branch is followed to block 422 of FIG. 4B. If the calling party CLID and relationship number combination are not successfully queried, then the "no" branch is followed to block 410.

At block 410, the SLS platform 115 may associate a new relationship number with the calling third party number and the subscriber's primary number and SLS number. At block 412, the central SLS database 116 is updated to include the newly created record — the calling third party is listed as a contact of the subscriber in the Private Relationship ID Table 310. At block 414, the call is redirected to the subscriber's primary number, thereby routing it to the subscriber TD 110. In redirecting the call, the calling party field may be populated with a combination of the newly assigned relationship number and the third party CLID.

At block 416, the subscriber TD 110 may receive the redirected call via SLS module 105 and the local SLS database 106 updated to include the newly assigned relationship number in association with the third party CLID. At block 418, the third party CLID is displayed to the subscriber and the subscriber is alerted to the incoming call. Notably, it is envisioned that displaying the CLID may include rendering the CLID itself, rendering a picture of the third party, rendering a name, etc. as is understood by those with skill in the art of graphical user displays and interfaces. At block 420, the call is connected by the SLS platform 115 when the subscriber answers the call with his subscriber TD 110.

Figure 4B:
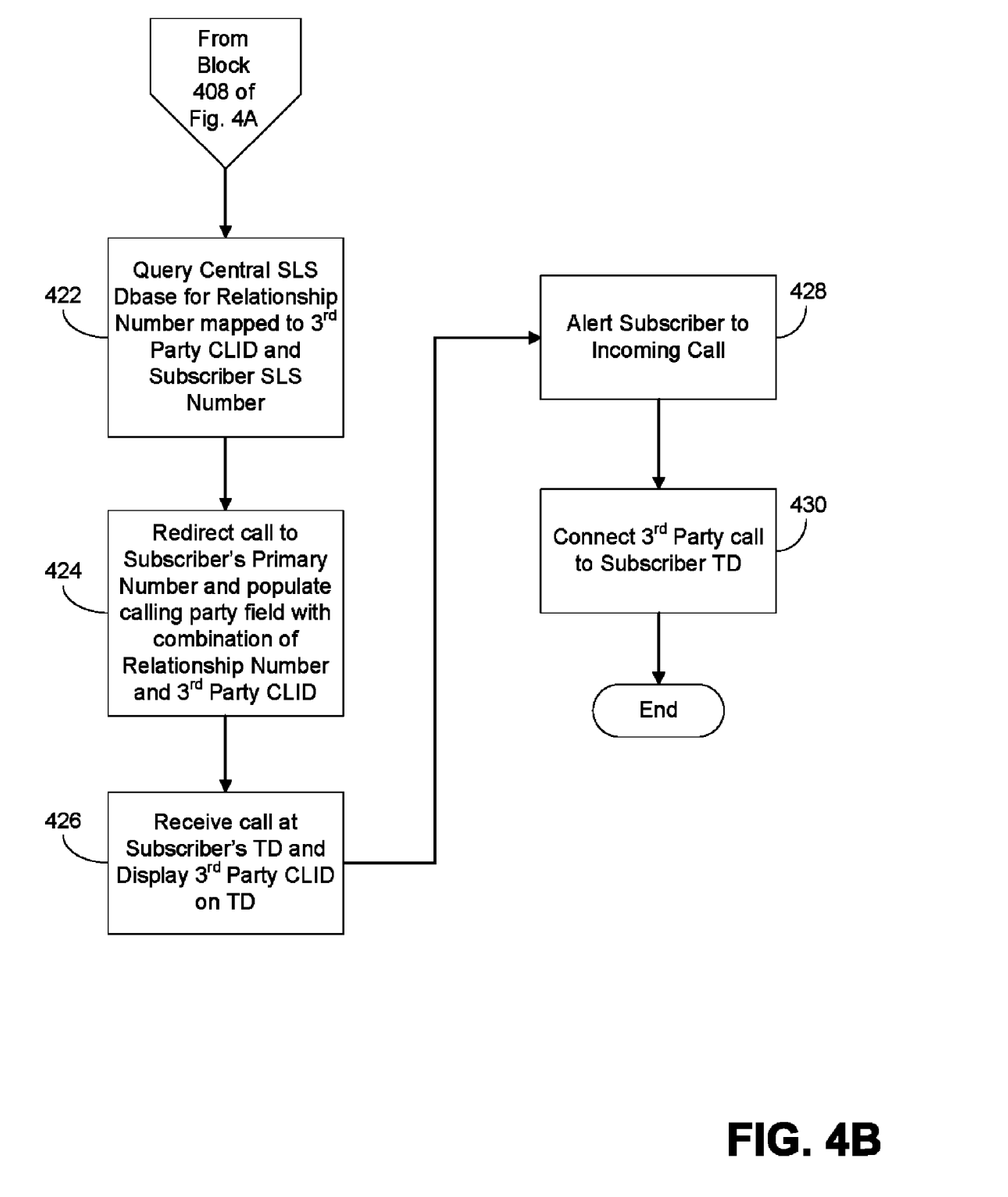

Turning now to FIG. 4B, if the "yes" branch is followed from decision block 408 of FIG. 4A, at block 422 the SLS platform 115 queries the central SLS database 116 for the relationship number that maps to the combination of the third party CLID and subscriber's SLS number. At block 424, the subscriber's primary number, as also identified from the query of block 422, is called by the SLS platform 115. At block 426, the call is received at the subscriber's TD 110 and the SLS module 105 recognizes that it originated from the SLS platform 115. At block 426, the relationship number and third party CLID contained in the calling party field of the call signaling causes the SLS module 105 to handle the call and display the third party CLID for the benefit of the subscriber. Notably, because the third party CLID may be queried from the local SLS database 106 by use of the relationship number, it is envisioned that some embodiments may not necessarily include the third party CLID in the calling party field of the call signaling.

At block 428 the subscriber is alerted to the incoming call and at block 430 the call is connected to the subscriber TD 110 by the SLS platform 115 when the subscriber answers the call. It is envisioned that, if the subscriber elects not to answer a call to the SLS number, the SLS module 105 in some embodiments may leverage a voicemail service or message service in response to the unanswered call. That is, it is envisioned that an SLS service may provide features and services dedicated to the SLS subscriber and separate from similar features and services associated with the subscriber's primary number.

Figure 4C:
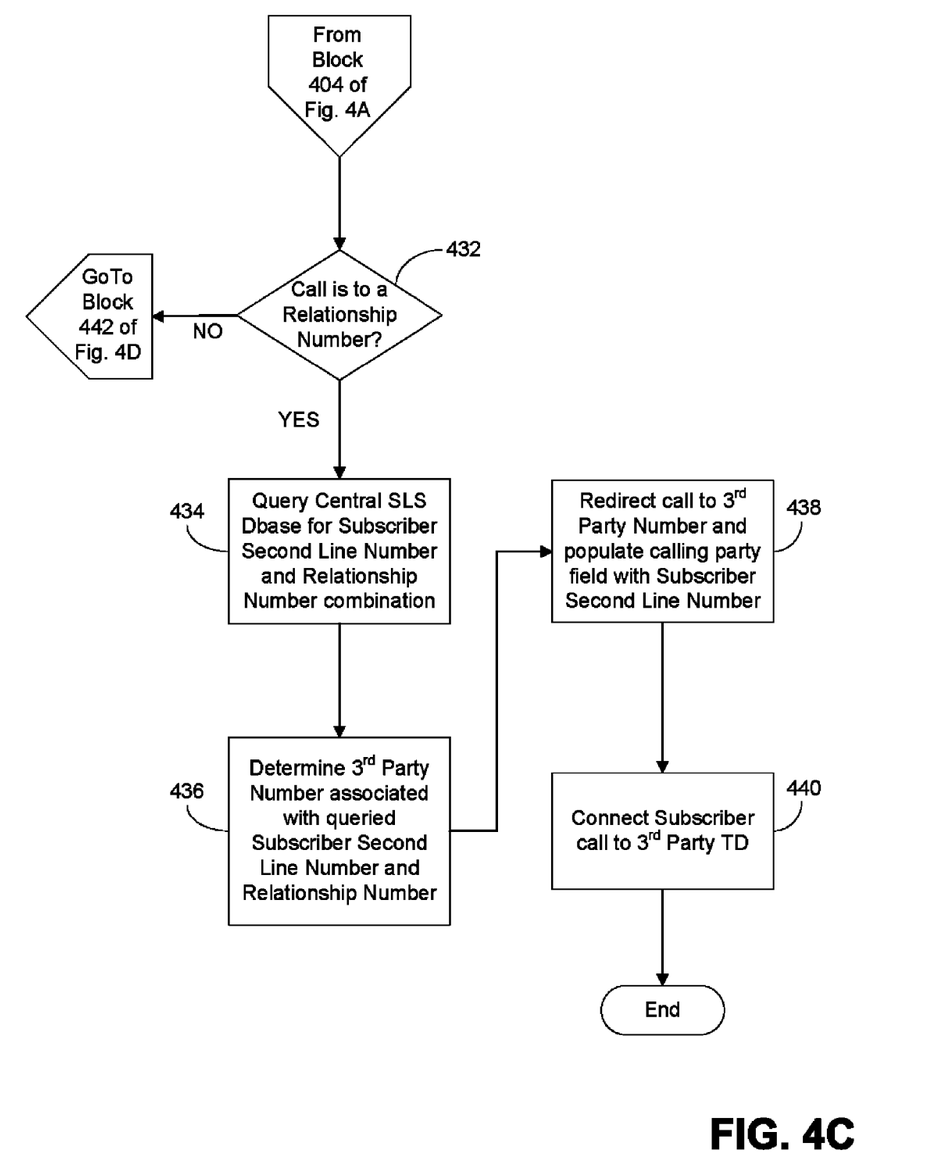

Turning now to FIG. 4C, if the "no" branch is followed from block 404 of FIG. 4A, at decision block 432 the SLS platform 115 determines whether the call is directed to a relationship number. Notably, if the call is directed to a relationship number, then it must have originated from a TD 110 associated with a subscriber of the SLS service. If the call was not routed to the SLS platform 115 because of being directed to a relationship number, the "no" branch is followed to block 442 of FIG. 4D. If, however, the call was routed to the SLS platform 115 because it was directed to a relationship number then the "yes" branch is followed to block 434.

At block 434, the central SLS database 116 is queried for the relationship number in combination with the SLS number from which the call originated. At block 436, the SLS platform 115 may determine the actual third party number with which the relationship number and the SLS number combination is associated. Having identified the actual third party number, the SLS redirection module 117 may deduce that the subscriber desires to contact the third party TD 120 associated with that actual third party number and, at block 438, the SLS platform 115 redirects the call to such TD 120. The calling party field of the call is populated with the subscriber's SLS number so that the third party will associate the incoming call with the second line number of the subscriber and not the primary number of the subscriber. At block 440, the call is connected to the third party TD 120.

Figure 4D:
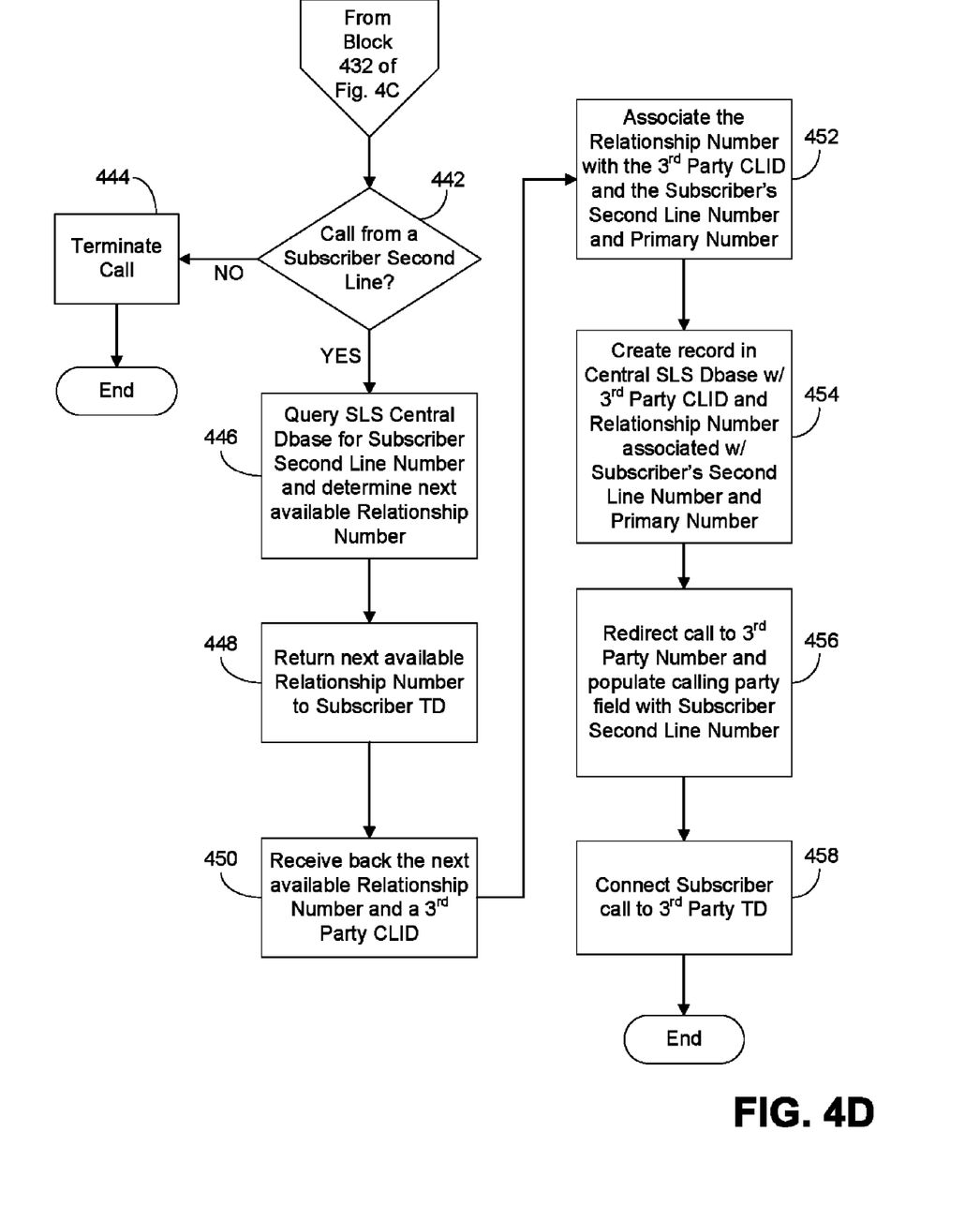

Turning now to FIG. 4D, if the "no" branch is followed from block 432 of FIG. 4C, at decision block 442 the SLS platform 115 determines whether the call originated from an SLS number of a subscriber. If not, then it is assumed that it was an errant call and the "no" branch is followed to block 444 and the call is disconnected. If the call did originate from a second line number (i.e., an SLS module 105 in a subscriber TD 110) associated with a subscriber to the SLS service, then the "yes" branch is followed to block 446. At block 446, it is deduced by the SLS platform 115 that the subscriber associated with the calling SLS number and/or the calling primary number desires to call a third party with which no relationship number has been associated with the actual third party number. The central SLS database 446 is queried to determine the next available relationship number for the subscriber's given SLS number. It is envisioned that the SLS module 105 may communicate with the SLS platform 115 in some embodiments to obtain a relationship number for a third party that has not previously been called via a session-based protocol such as, but not limited to, an unstructured supplementary services data ("USSD") protocol. As is understood in the art of telecommunications protocols, a gateway such as a USSD gateway may be used to route messages from a signaling network to service applications and back. In this way, certain embodiments of an SLS module 105 may communicate with an SLS platform 115 to designate and acquire a relationship number to a third party who has not been called by the subscriber before (or, for that matter, a third party who has not placed a call to the subscriber before). Moreover, USSD is offered herein for exemplary purposes and is not meant to limit the type of communications protocol that may be leveraged by certain embodiments. For example, it is envisioned that short message service ("SMS") protocol, multimedia messaging service ("MMS") protocol, and/or other protocols may be used by some embodiments. It is envisioned that an IP-based interaction over the TD's data service may be used by some embodiments. As would be recognized by one of ordinary skill in the art, use of session based protocols or other communication protocols may minimize temporal delays in allocating and acquiring relationship numbers between an SLS module 105 and an SLS platform 115.

At block 448, the determined next available relationship number is returned to the SLS module 105 of the subscriber TD 110. At block 450, the SLS module 105 sends back to the SLS platform 115 the next available relationship number it was provided in combination with the third party number the subscriber desires to call. At block 452, having the relationship number, the third party CLID, the subscriber's primary number and the subscriber's SLS number, the SLS platform 115 may update the central SLS database 116 to include the record at block 454. Advantageously, at such point, the central SLS database 116 and the local SLS database 106 contain consistent records with regard to the relationship between the third party and the subscriber.

At block 456, the call is redirected by the SLS platform 115 and the calling party field is populated with the second line number of the subscriber for the benefit of the called third party. To the third party TD 120, it will look as if the call originated from the second line number of the subscriber instead of the primary line number associated with subscriber TD 110. At block 458, both legs of the call are connected by the SLS platform 115.

Figure 5:
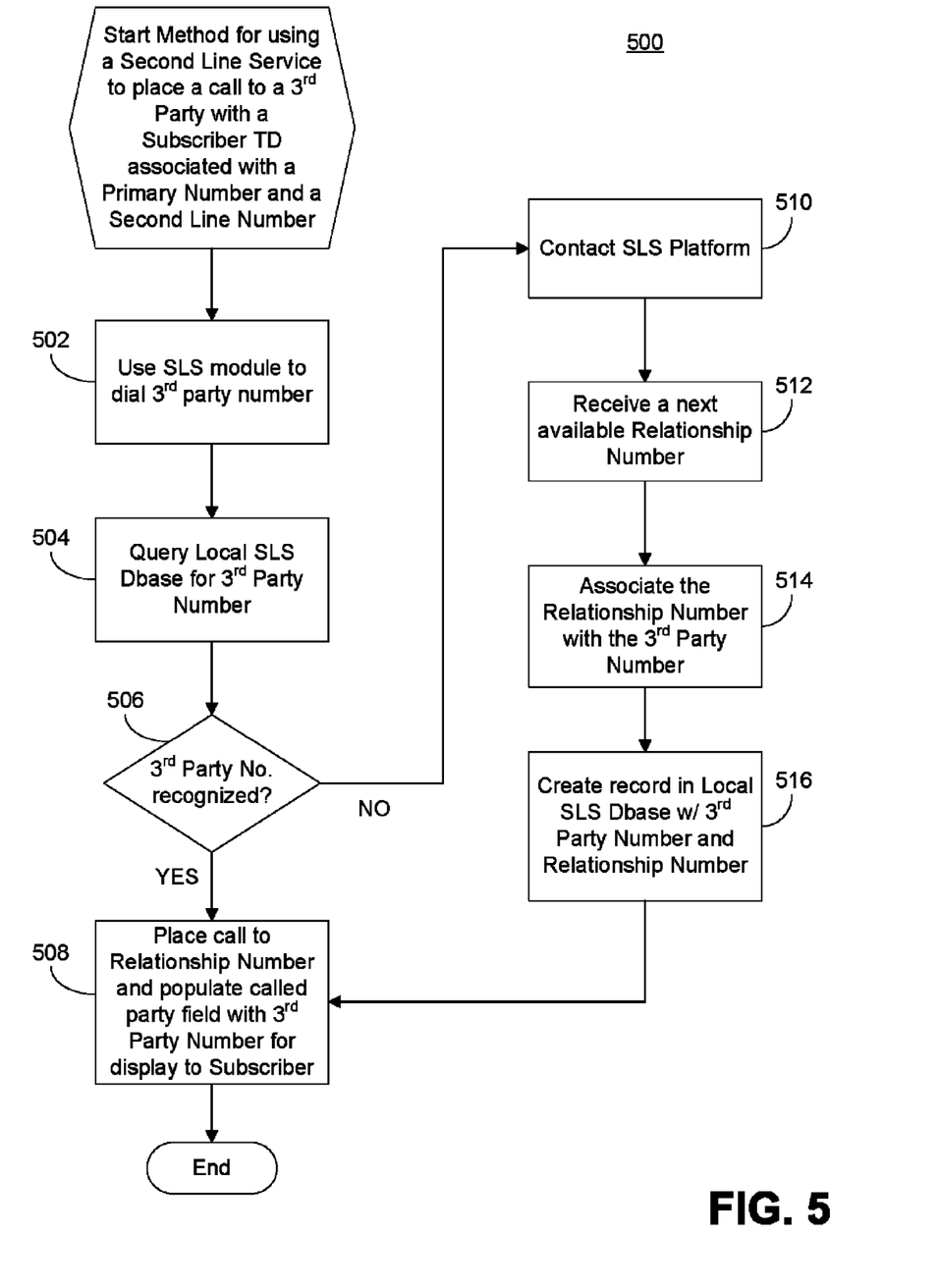
FIG. 5 illustrates an exemplary method for routing calls from a subscriber TD associated with a primary number and a second line number to a third party TD.

FIG. 5 illustrates an exemplary method 500 for routing calls from a telecommunications device associated with a primary number and a second line number, such as subscriber device 110, to a third party telecommunications device, such as third party TD 120A. At block 502, the SLS module 105 is used by the user of subscriber TD 110 to dial the phone number of a third party associated with third party TD 120A. The SLS module 105 queries local SLS database 106 for the dialed third party number. If the third party number is recognized in the query, at decision block 506, the "yes" branch is followed to block 508 and a call is placed to the relationship number associated with the third party number and reflected in the queried record. Further, at block 508, when the relationship number is called (thus routing the call to the SLS platform for eventual connection to the third party TD 120A) the called party field is populated with the third party number and rendered on the display component 103 of the subscriber TD 110 for the benefit of the subscriber.

If the third party number is not recognized at decision block 506, then the "no" branch is followed to block 510. At block 510, the SLS platform 115 is contacted and at block 512 a next available relationship number is provided back to the SLS module 105. At blocks 514 and 516, the SLS module 105 updates the local SLS database 106 with the relationship number in combination with the associated third party number. The call is completed at block 508 by leveraging the relationship number as previously described.

Figure 6:
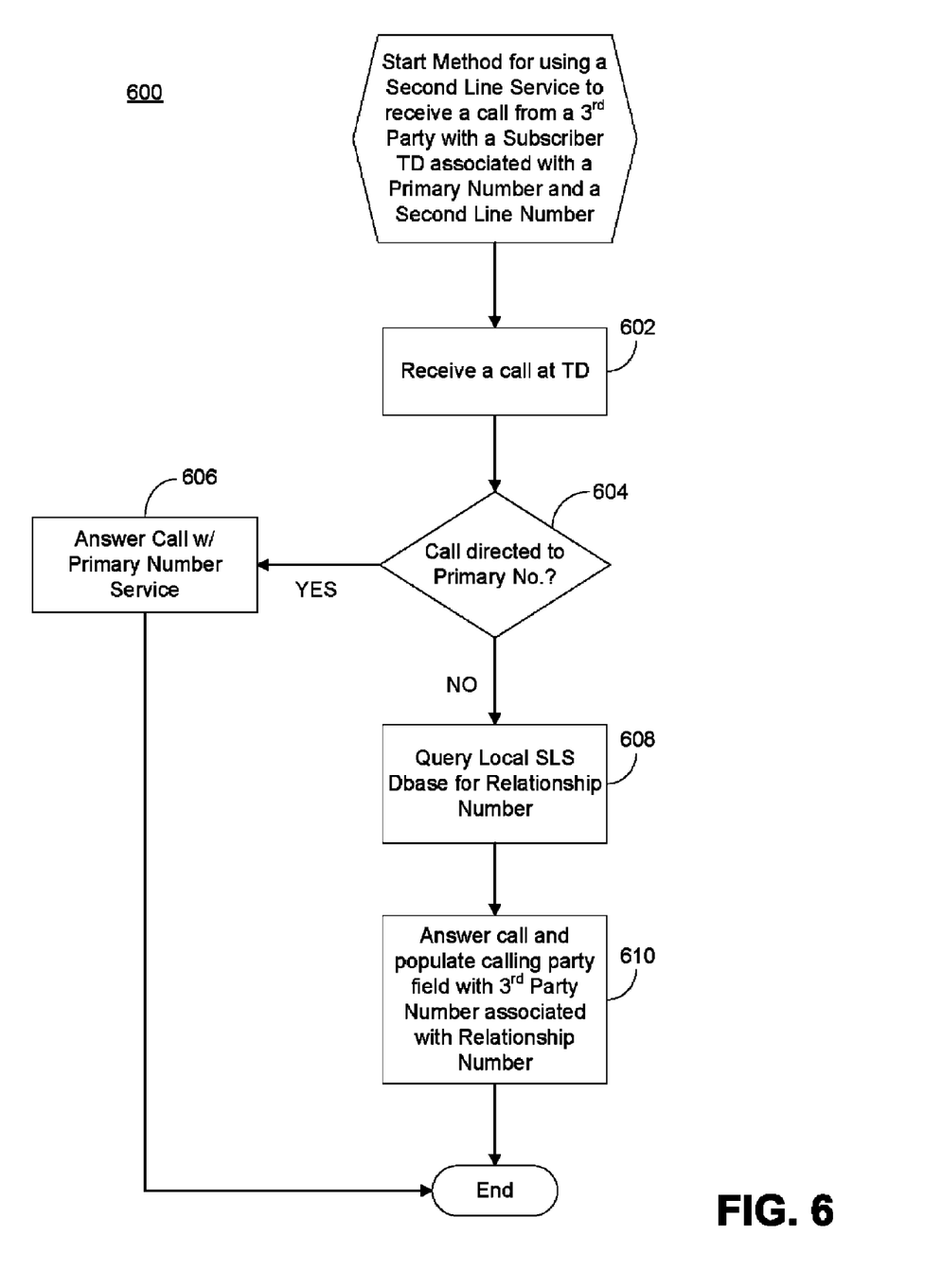
FIG. 6 illustrates an exemplary method for routing calls from a third party TD to a subscriber TD associated with a primary number and a second line number.

FIG. 6 illustrates an exemplary method 600 for routing calls from a third party telecommunications device, such as third party TD 120A, to a telecommunications device associated with a primary number and a second line number, such as subscriber device 110. Beginning at block 602, an incoming call from a third party TD 102A is received at a subscriber TD 110. At decision block 604, the SLS module 105 determines whether the call was directed to the primary number associated with the TD 110 or the SLS number associated with the subscriber TD 110. If the call was directed to the primary number, then the "yes" branch is followed to block 606 and the call is answered in association with the features and services of the primary number. If the call was directed to the SLS number associated with the subscriber TD 110 then the "no" branch is followed block 608. At block 608, the SLS module 105 queries local SLS database 106 to find the relationship number associated with the incoming call. At block 610, the call is answered with the features and services associated with the second line service and the called party field on the display 103 used by SLS module 105 is populated with the third party CLID for the benefit of the subscriber.

Certain steps or blocks in the processes or process flows described in this specification naturally precede others for the invention to function as described. However, the invention is not limited to the order of the steps or blocks described if such order or sequence does not alter the functionality of the invention. That is, it is recognized that some steps or blocks may performed before, after, or parallel (substantially simultaneously with) other steps or blocks without departing from the scope and spirit of the invention. In some instances, certain steps or blocks may be omitted or not performed without departing from the invention. Also, in some instances, multiple actions depicted and described as unique steps or blocks in the present disclosure may be comprised within a single step or block. Further, words such as "thereafter", "then", "next", "subsequently", etc. are not intended to limit the order of the steps or blocks. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, acoustic and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for routing calls between a third party telecommunications device ("TD") and a subscriber TD, wherein the subscriber TD has a primary number associated with a primary service provider and at least one second line service number ("SLS number"), the method comprising the steps of:
   receiving a call at an SLS platform, wherein the SLS platform is in communication with a network of a primary service provider to the subscriber TD and a network of a primary service provider to the third party TD;
   determining that the call was routed to the SLS platform from the third party TD through the telephone network because the call was directed to an SLS number associated with a subscriber to the second line service, wherein the SLS number consists only of a valid network terminable number that is recognized by the telephone network as being a number to be processed by the SLS platform and, wherein the SLS number does not include the primary number of the subscriber TD or any prefix or suffix;
   the SLS platform determining if a relationship number is associated with the received SLS number and an actual calling number associated with the third party TD and, if not, assigning a relationship number to be associated with the received SLS number and the actual calling number associated with the third party TD, wherein the relationship number is a valid ten digit dialable number that is recognized by the telephone network as a valid network terminable number that is routed to the SLS platform for processing if a subsequent call is placed to the relationship number from the subscriber TD;
   identifying the primary number of the subscriber TD that is associated with the SLS number;
   if the relationship number has not been sent to the subscriber TD, the SLS platform establishing a data channel with the subscriber TD and transmitting information to identify the relationship number, the SLS number and the actual calling number to the subscriber TD over the data channel; and
   the SLS platform routing the received call over a voice channel to the primary number associated with the subscriber TD and modifies the calling number field of the received call to consist of only the relationship number without including any further information, whereby the subscriber TD can translate the relationship number into the identification of the called SLS number and the actual calling number and, a subsequent call to the relationship number by the subscriber ID will result in a call being placed to the third party TD through the SLS platform.

2. The method of claim 1, further comprising storing the relationship number and the actual calling number associated with the third party in a local database of the subscriber TD.

3. The method of claim 2, wherein the subsequent call to the relationship number by the subscriber TD is recognized by the telephone network, without the use of any further information, as a number to be routed to the SLS platform.

4. The method of claim 3, further comprising receiving the subsequent call to the third party TD at the SLS platform and using the relationship number to determine an actual telephone number associated with the third party TD and redirecting the call to the determined actual telephone number.

5. The method of claim 1, further comprising displaying the actual calling number associated with the third party TD to a user of the subscriber TD.

6. A system for routing calls between a third party telecommunications device ("TD") and a subscriber TD, wherein the subscriber TD includes a primary number and is serviced by a primary service provider, as well as a second line service number ("SLS number"), the system comprising:
  an SLS platform that is in communication with a telecommunications network and is configured to:
    receive a call that has been routed to the SLS platform by the telecommunications network;
    determine that the call was routed to the SLS platform from the third party TD because it was directed to the SLS number of the subscriber;
    identify a relationship number that is associated with both the SLS number and an actual calling number associated with the third party TD and, identifying the primary number of the subscriber TD associated with the SLS number, wherein
  the relationship number consists only of a dialable number that is recognized as a valid telephone number by the telecommunications network and does not include a prefix or suffix;
  if the relationship number has not been sent to the subscriber TD, the SLS platform establishing a data channel with the subscriber TD and transmitting information to identify the relationship number, the SLS number and the actual calling number to the subscriber TD over the data channel; and
  route the call to the primary number associated with the subscriber TD over a voice channel and insert the relationship number into the calling number field of the received call prior to redirecting the call without including any further information, whereby the subscriber TD can translate the relationship number into the identification of the called SLS number and the actual telephone number of the third party and, a subsequent call to the relationship number by the subscriber TD will result in a call being placed to the third party TD through the SLS platform.

7. The system of claim 6, wherein the subscriber TD is configured to store the relationship number and the actual calling number associated with the third party in a local database.

8. The system of claim 7, wherein a subsequent call to the relationship number is routed to the SLS platform by the telecommunications network and the SLS platform is further configured to receive the subsequent call at the SLS platform and use the relationship number to determine an actual telephone number associated with the third party TD and redirect the call to the determined actual telephone number and to insert the SLS number of the subscriber TD into the calling number field without including any further information.

9. A method for routing calls over a telecommunications network between a third party telecommunications device ("TD") and a subscriber TD, wherein the subscriber TD includes a primary number serviced by a primary service provider and a second line service number ("SLS number"), the method comprising the steps of:
  receiving a user actuation of the subscriber TD requesting a call to a third party phone number associated with the third party TD, the call being originated from the SLS number of the subscriber TD; and
  based on the third party phone number, the primary number of the subscriber TD and the SLS number of the subscriber TD, the subscriber TD operates to place a call over a voice channel to the third party by placing a call to a relationship number, wherein the relationship number:
    is recognized by the telecommunications network as a valid dialable and terminable telephone number and does not include any further information and a call initiated to the relationship number results in the telecommunications network routing the call to an SLS platform that is in communication with the telecommunications network;
    is initially obtained by the subscriber TD from an SLS platform over a data channel connection between the SLS platform and the subscriber TD by the subscriber TD receiving information over the data channel that identifies the relationship number, the SLS number of the subscriber TD and the actual calling number of the third party TD to the subscriber TD such that a call attempt to the relationship number initiates a call to the actually calling number of the third party TD from the SLS number of the subscriber TD; and
  the relationship number maps the SLS number of the subscriber TD to the third party phone number; and
  wherein a different relationship number maps the SLS number to any other third party phone number.

10. The method of claim 9, further comprising populating the calling party field of the call with the SLS number.

11. The method of claim 9, further comprising the steps of: requesting the relationship number from the SLS platform; receiving the relationship number at the subscriber TD; and storing the relationship number at the subscriber TD in association with the third party number.

12. The method of claim 11, wherein requesting the relationship number from the SLS platform comprises using a session based communication protocol.

13. The method of claim 12, wherein the session based communication protocol is an unstructured supplementary services data ("USSD") protocol.

* * * * *